United States Patent

Zuffada et al.

[11] Patent Number: 6,078,462
[45] Date of Patent: Jun. 20, 2000

[54] DEVICE AND METHOD FOR PROCESSING SERVO SIGNALS IN A PARALLEL ARCHITECTURE PRML READING APPARATUS FOR HARD DISKS

[75] Inventors: Maurizio Zuffada, Milan; Paolo Gadducci, Pisa; David Moloney, Cornaredo; Valerio Pisati, Bosnasco, all of Italy

[73] Assignee: STMicroelectronics, S.r.l., Agrate Brianza, Italy

[21] Appl. No.: 08/996,915

[22] Filed: Dec. 23, 1997

Related U.S. Application Data

[63] Continuation of application No. 08/446,483, May 23, 1995, abandoned.

[30] Foreign Application Priority Data

May 23, 1994 [EP] European Pat. Off. .............. 94830235

[51] Int. Cl.[7] .......................... G11B 20/06; G11B 5/596; G11B 5/09; G11B 5/02
[52] U.S. Cl. .......................... 360/77.08; 360/29; 360/46; 360/51
[58] Field of Search ................................. 360/32, 46, 51, 360/77.08, 29

[56] References Cited

U.S. PATENT DOCUMENTS

| | | | |
|---|---|---|---|
| 4,481,643 | 11/1984 | Kitazawa | 375/12 |
| 4,570,193 | 2/1986 | Yamashita | 360/33.1 |
| 4,586,094 | 4/1986 | Chambors et al. | 360/77 |
| 4,647,994 | 3/1987 | Irwin et al. | 360/85 |
| 5,089,757 | 2/1992 | Wilson | 318/560 |
| 5,255,128 | 10/1993 | Inoue et al. | 360/40 |
| 5,255,131 | 10/1993 | Coker et al. | 360/48 |
| 5,325,322 | 6/1994 | Bailey et al. | 364/825 |
| 5,396,376 | 3/1995 | Chambors et al. | 360/48 |
| 5,420,893 | 5/1995 | Ward | 375/368 |
| 5,424,881 | 6/1995 | Behrens et al. | 360/40 |
| 5,592,340 | 1/1997 | Minuhin et al. | 360/46 |
| 5,668,678 | 9/1997 | Reed et al. | 360/51 |
| 5,774,298 | 6/1998 | Cheung et al. | 360/78.14 |
| 5,796,535 | 8/1998 | Tuttle et al. | 360/51 |

FOREIGN PATENT DOCUMENTS

| | | |
|---|---|---|
| 0 385 867 | 9/1990 | European Pat. Off. ......... H04N 5/92 |
| 0 514 991 | 11/1992 | European Pat. Off. ........ G11B 20/10 |
| 0 595 454 | 5/1994 | European Pat. Off. ........ G11B 20/10 |
| 61-71470 | 4/1986 | Japan . |
| 63-18821 | 1/1988 | Japan . |
| 6-176499 | 6/1994 | Japan . |

OTHER PUBLICATIONS

Forney, Jr., "The Viterbi Algorithm," *Proceedings of the IEEE* 61(3):268–278, Mar. 1973.

Siegel et al., "Moodulation and Coding for Information Storage," *IEEE Communications Magazine*, pp. 68–86, Dec. 1991.

Spencer et al., "Analog Implementations of Sampling Detectors," *IEEE Transactions on Magnetics* 27(6):4516–4521, Nov. 1991.

Goodenough, "DSP Technique Nearly Doubles Disk Capacity," *Electronic Design*, pp. 53–56, Feb. 4, 1993.

*Primary Examiner*—Andrew L. Sniezek
*Assistant Examiner*—Regina Y. Neal
*Attorney, Agent, or Firm*—Theodore E. Galanthay; David V. Carlson; Seed IP Law Group, PLLC

[57] ABSTRACT

The device is to be used with a parallel architecture partial response maximum likelihood (PRML) reading apparatus comprising a variable-gain input amplifier, a low-pass analog filter, a transversal continuous-time analog filter and two distinct and parallel processing channels interposed between the transversal analog filter and an RLL-NRZ decoder. The two processing channels comprise respective analog-digital converters and respective Viterbi detectors and operate according to sampling sequences that alternate with one another. The device for processing the servo signals comprises a rectifier connected to the outputs of the analog-digital converters and an integrator.

14 Claims, 2 Drawing Sheets

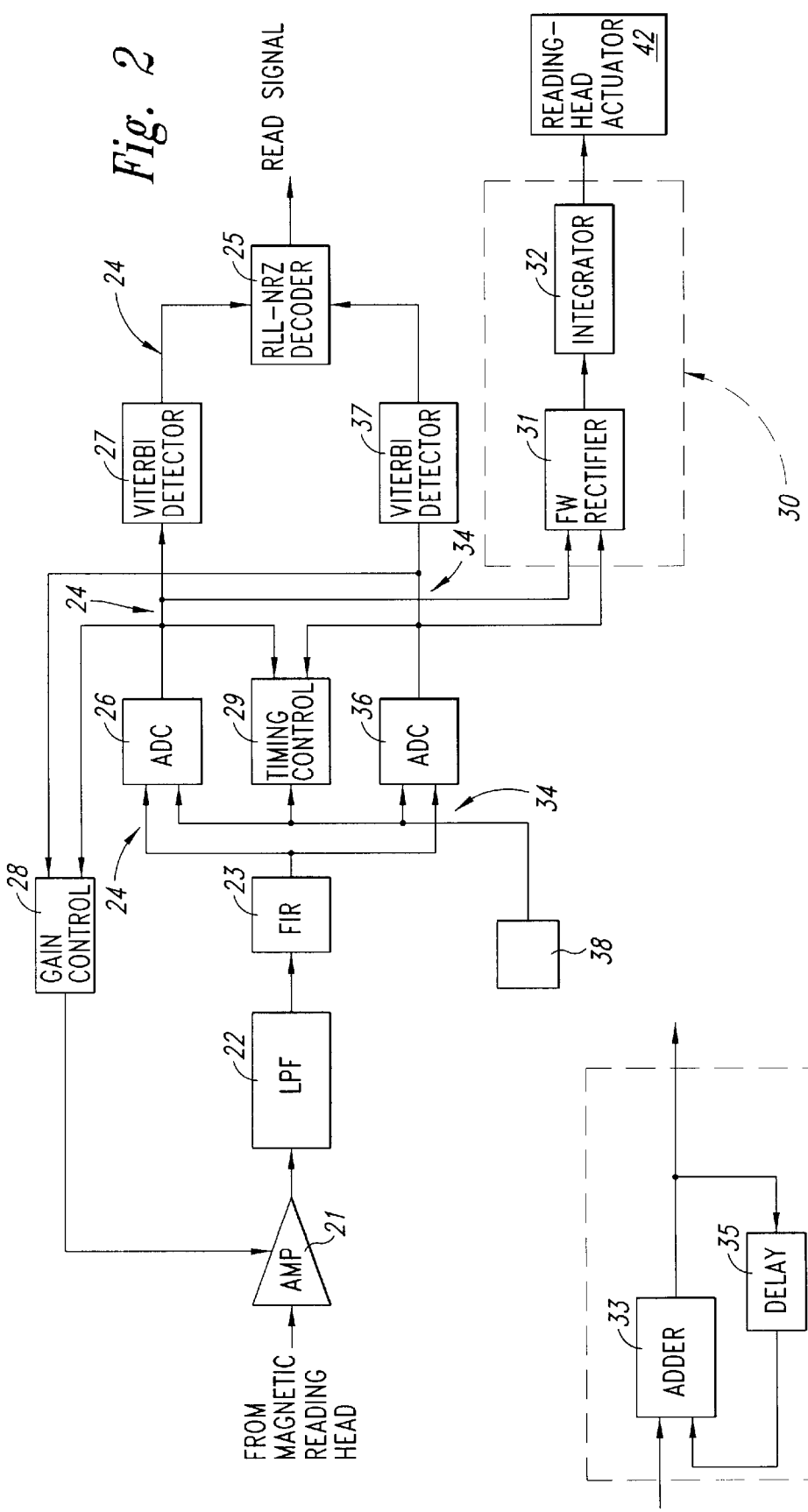

DEVICE AND METHOD FOR PROCESSING SERVO SIGNALS IN A PARALLEL ARCHITECTURE PRML READING APPARATUS FOR HARD DISKS

CROSS-REFERENCE TO RELATED APPLICATION

This application is a continuation of U.S. patent application Ser. No. 08/446,483, filed May 23, 1995, now abandoned. The present application claims priority from European Patent Application No. 94830235.1, filed May 23, 1994, and incorporated herein by reference. The present application is related to pending U.S. patent application entitled "Apparatus and Method for Processing a Data Signal From a Magnetic-Media Reading Head," by Maurizio Zuffada, Paolo Gadducci, David Moloney and Roberto Alini and filed concurrently herewith (U.S. application Ser. No. 08/448,047, filed May 23, 1995) which claims priority from European Patent Application No. 94830236.9, filed May 23, 1994, all of which are incorporated herein by reference.

TECHNICAL FIELD

The present invention relates generally to electronic devices and more specifically to a device for processing servo signals in a parallel architecture PRML reading apparatus for hard disks.

BACKGROUND OF THE INVENTION

PRML (Partial-Response signaling with Maximum-Likelihood sequence detection) is a technique for processing data read from a magnetic support (such as a hard disk or a magnetic tape), that provides for the use and sampling of only a part of the input signal's frequency band and the search for the maximum likelihood of correspondence of the levels of the output signal with the samples obtained from the input signal.

In an existing PRML reading/writing channel, the analog signal from the magnetic head is processed and reconstructed digitally through an apparatus that carries out a first analog equalization by means of a variable-gain input amplifier and a continuous low-pass filter. At the filter output, with a suitable selection of the cut-off frequency, the high-frequency accentuation (boost), and other parameters such as group delay, it is possible to obtain a signal with a minimum InterSymbol Interference (ISI). The output of the analog filter is then sampled through an analog-to-digital converter and subsequently processed through a transversal digital filter (called Finite Impulse Response (FIR)) that further reduces the ISI. The FIR filter output signal may be processed by another filter (Pole Tip Filter) that eliminates the small undesired peaks produced when the magnetic support enters or leaves the active area of a thin-film reading head. The output of the Pole Tip Filter (or the FIR filter if the Pole Tip Filter is not used) is processed by a Viterbi detector i.e., a maximum-likelihood sequence detector operating with the Viterbi algorithm (which is described in G. D. Forney, Jr., "The Viterbi Algorithm", Proc. IEEE, vol. 61, No. 3, pages 268–278, March 1973) which converts a sequence with many bits into a sequence with just one bit on the basis of a maximum likelihood concept). The output of the Viterbi detector is processed by a decoder capable of converting the Run Length Limited (RLL) code commonly utilized for writing data on a magnetic support into the Non-Return to Zero (NRZ) code commonly utilized for allowing a user to use the read signal.

There are also two feed-back loops. The first, which contains a unit for controlling the gain of the input amplifier, allows the stabilization of the input signal's amplitude. The second, which contains a unit for controlling the timing, allows the timing signal of the analog-to-digital converter to be constructed from the data read from the magnetic support.

When an apparatus as described above is used for reading data stored on a hard disk, it is typically provided with a device that processes special signals prerecorded on the disk by the manufacturer (normally called "servo signals") to obtain appropriate signals for operating the actuator of the head's support arm so as to control the position of the reading head.

In order to attain high track densities with a low likelihood of off-track operation, the existing technique provides for the extraction of the integral of the servo signals' module (typically 4 bursts at the PRML channel's maximum response frequency) in a predetermined timing window, and for the passage of the analog value of the integrated voltages to an external, high-resolution (10 bit) analog-to-digital converter. The output of the analog-to-digital converter is processed by a digital signal processor that controls the actuator of the head's support arm.

The operation of integration is necessary to reduce the effects of the noise introduced in the reading process, a noise that increases as the distance between adjacent tracks decreases.

An existing device for processing servo signals using this technique in a PRML reading apparatus as described above comprises in particular an analog demodulator formed by a full-wave rectifier, which receives and rectifies the analog signal at the output of the low-pass filter, an integrator, and an S/H buffer with an analog multiplexer, which together, store the detected signals and transmit them in time succession to the external analog-to-digital converter.

In European Patent Application No. 94830236.9 filed on May 23, 1994 by the applicant of the present application, there is described a new and advantageous parallel architecture PRML reading apparatus, wherein the transversal filter is of the analog continuous-time type and is located at the output of the low-pass analog filter. Between the transversal filter and the RLL-NRZ decoder there are two parallel processing channels. Each channel comprises an analog-to-digital converter and a Viterbi detector arranged in series and operates according to sampling sequences that alternate with one another. EPA 94830236.9 is incorporated by reference herein for all purposes.

SUMMARY OF THE INVENTION

An object of the present invention is to provide a servo-signal processing device that can be used in a parallel architecture PRML reading apparatus such as that described in EPA 94830236.9.

According to the invention such object may be attained with a device for processing servo signals in a parallel architecture PRML reading apparatus of the type comprising a variable-gain input amplifier, a low-pass analog filter, a transversal analog filter, and two distinct and parallel processing channels interposed between the transversal analog filter and an RLL-NRZ decoder, said processing channels comprising respective analog-to-digital converters followed by respective Viterbi detectors and operating according to sampling sequences that alternate with one another, said device comprising a rectifier and an integrator and being characterized in that said rectifier is connected to the outputs of said analog-to-digital converters.

In this way, the device for processing the servo signals no longer receives the analog signal before it is integrated, sampled, and sent to an external high-resolution analog-to-digital converter. Instead, the device receives alternating sequences of digital signals that it can rectify with a rectifier that is less complex than that required for an analog signal. Furthermore, these digital signals do not require the further operations of sampling, multiplexing, and high-resolution analog-to-digital conversion. In particular, this latter operation has in fact already been carried out by the two (typically 6-bit) converters that process the main signal and whose sampling frequency may be increased within the limits of the periods of operation in the servo mode.

BRIEF DESCRIPTION OF THE DRAWINGS

The features of the present invention will be understood more clearly by making reference, as an example, to the enclosed drawings, wherein:

FIG. 2 shows a schematic block diagram of a parallel architecture PRML reading apparatus that is provided with a device for processing servo signals according to the present invention; and FIG. 3 shows in more detail the integrator used in the device of FIG. 2.

DETAILED DESCRIPTION OF THE INVENTION

Figure 1:
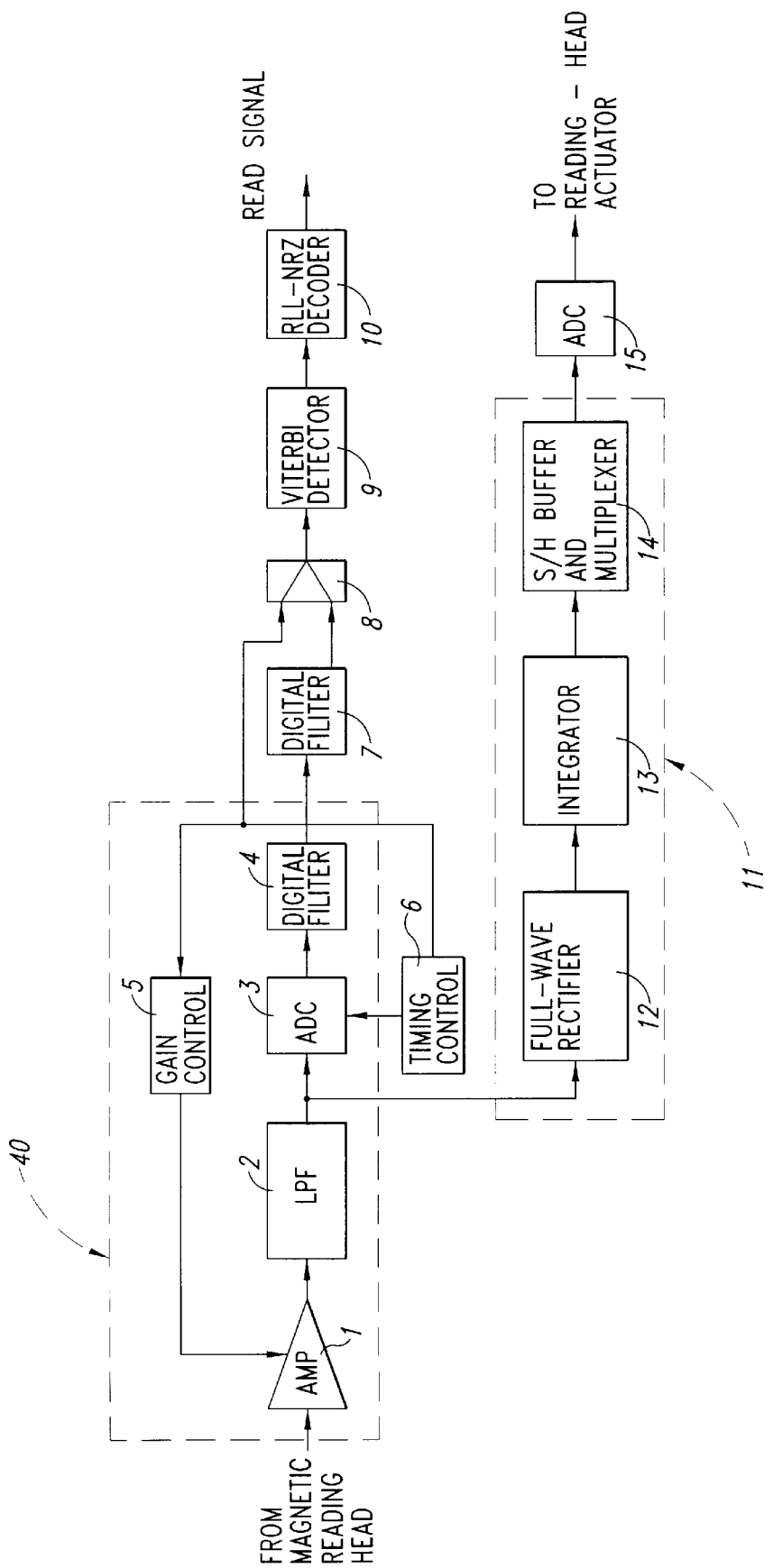
FIG. 1 shows a schematic block diagram of a PRML reading apparatus of the traditional type that is provided with an existing device for processing servo signals.

There is represented in FIG. 1 a PRML reading apparatus of the traditional type, provided with a device for processing servo signals also of the traditional type.

The above-mentioned figure includes a front-end circuit 40 that comprises a variable-gain input amplifier 1, a low-pass analog filter (LPF) 2, a 6-bit analog-to-digital converter (ADC) 3, a transversal digital filter 4, and a gain control unit 5 inserted in a gain control loop for the input amplifier 1. The FIG. 1 circuit also includes a timing control unit 6 inserted in a timing control loop for the converter 3, a further filter 7 for eliminating the undesired peaks produced by thin-film heads (not shown) if present, an on/off switch 8 of the filter 7, a Viterbi detector 9, and an RLL-NRZ decoder 10.

The corresponding control device for processing the servo signals comprises an analog demodulator 11 formed by a full-wave rectifier 12, which is connected to the output of the low-pass filter 2, an integrator 13, and an S/H (sample and hold) buffer unit and analog multiplexer 14, whose output is connected to the input of a 10-bit analog-to-digital converter 15.

At the output of the converter 15 there is thus available a digital signal suitable for controlling the actuator of the reading head.

There is on the other hand represented in FIG. 2 a parallel architecture PRML reading apparatus according to previously incorporated EPA 94830236.9, that comprises in series a variable-gain input amplifier 21, a low-pass analog filter 22 and a transversal continuous-time analog filter (FIR) 23.

Two parallel processing channels 24 and 34 branch out from the output of FIR 23 and converge in an RLL-NRZ decoder 25. Each channel comprises a 6-bit analog-to-digital converter 26 and 36 and a Viterbi detector 27 and 37.

A gain control loop for the input amplifier 21 comprises a gain control unit 28 that receives the outputs of the two analog-to-digital converters 26 and 36 and, based on these outputs, controls the gain of the input amplifier 21.

A timing control loop, substantially constituted by two half-loops, one for each analog-to-digital converter 26 and 36, comprises a timing control unit 29, which reconstructs the clock signals for the two converters 26 and 36 from the data read fn the magnetic support (not shown).

The writing code used (such as for example the RLL code (0, 4/4) mentioned in Paul H. Siegel and Jack K. Wolf, "Modulation and Coding for Information Storage", IEEE Communications Magazine, December 1991, pages 68–86); is such as to provide alternated sequences of samplings on the two channels 24 and 34, which thus independently process the even index samples and the odd index samples at a frequency approximately equal to half that of the RLL frequency.

With the above-mentioned parallel-architecture reading apparatus there is associated a control device 30 for the servo signals. Device 30 comprises a full-wave rectifier 31 connected to the outputs of the two analog-to-digital converters 26 and 36, and an integrator 32.

At the output of integrator 32 the digital signal for controlling the actuator of the reading head is thus already available.

A schematic block diagram of one embodiment of the integrator 32 is illustrated in FIG. 3 and comprises an adder 33 with a feed-back loop including a delay circuit 35.

A switch 38 is for alternately operating the PRML reading apparatus between a data-processing mode and a servo-signal processing mode.

From the foregoing, it will be appreciated that, although embodiments of the invention have been described herein for purposes of illustration, various modifications may be made without deviating from the spirit and scope of the invention. Accordingly, the invention is not limited except as by the appended claims.

What is claimed is:

1. A device for processing servo signals and data for a reading apparatus that reads said servo signals and data from a magnetic storage medium, the device comprising:

a variable-gain input amplifier coupled to said reading apparatus;

a low-pass analog filter coupled to said amplifier;

a transversal analog filter coupled to said low-pass filter;

two distinct and parallel processing channels coupled between said transversal analog filter and a decoder that is structured to generate a read signal that includes said data, said processing channels comprising respective analog-to-digital converters followed by respective Viterbi detectors and operating according to sampling sequences that alternate with one another and according to sampling frequencies that are high enough to allow said analog-to-digital converters to process said data; and a demodulator circuit including an integrator circuit coupled to the outputs of said analog-to-digital converters, said demodulator circuit structured to asynchronously demodulate the servo signals, said integrator circuit structured to compute an integral of rectified servo signals and to generate a read-head-actuator-position signal for said reading apparatus in response to said servo signals.

2. The device according to claim 1 wherein said integrator circuit comprises an adder provided with a feed-back loop comprising a delay circuit.

3. The device according to claim 1 wherein said transversal filter comprises an analog continuous-time filter.

4. The device of claim 1, further comprising a rectifier connected between the analog-to-digital converters and the integrator circuit, the rectifier having an input connected to the output of the analog-to-digital converters and having an output connected to the integrator circuit.

5. An apparatus for generating a position control signal for a magnetic-media reading head that reads servo signals and data from a storage medium, the apparatus comprising:

a variable-gain amplifier operable to amplify an analog signal from said head;

a low-pass filter operable to filter said amplified analog signal;

a transversal analog continuous-time filter operable to filter said low-pass-filtered analog signal;

multiple analog-to-digital converters that sample said transverally filtered analog signal fast enough to process said data and that are operable to convert said transversally filtered analog signal into multiple digital signals;

multiple Viterbi detectors that are each coupled to a respective one of said converters;

a decoder that is coupled to said Viterbi detectors and that is structured to generate a read signal that includes said data; and a demodulator circuit including an integrator circuit having an input terminal coupled to receive an input signal from said analog-to-digital converters, said input signal including reading-head position information from said servo signals, said demodulator circuit structured to asynchronously demodulate said position information, said integrator circuit structured to compute an integral of said position information and to generate said position control signal in response to said position information.

6. The apparatus of claim 5 wherein said integrator circuit comprises:

a circuit structured to delay said control signal; and an adder structured to add said delayed control signal to said intermediate signal to generate said control signal.

7. An apparatus for processing data and servo signals from a magnetic-disk reading head having an actuator, said apparatus also for generating a position control signal in response to said servo signals to control said actuator, said apparatus comprising:

a variable-gain amplifier operable to receive an analog signal from said head;

a low-pass filter coupled to said amplifier;

a transversal continuous-time analog filter coupled to said low-pass filter;

a run-length-limited-non-return-to-zero decoder structured to provide a read signal that includes said data;

multiple parallel processing channels interposed between said transversal filter and said decoder, each of said channels comprising, an analog-to-digital converter coupled to said transversal filter and having a converter output terminal, said analog-to-digital converter operating at a sampling frequency that is high enough to process said data, and a Viterbi detector coupled between said converter output terminal and said decoder;

a rectifier coupled to said converter output terminal from each of said channels to rectify the servo signals; and a demodulator circuit having an integrator circuit coupled to said rectifier and structured to asynchronously demodulate the servo signals, said integrator circuit structured to compute an integral of said rectified servo signals and to generate said position control signal in response to said servo signals.

8. The apparatus of claim 7 wherein said integrator circuit, comprises:

an integrator input terminal;

an integrator output terminal;

an adder coupled between said integrator input and said integrator output terminals; and a delay circuit having a delay input terminal coupled to said integrator output terminal and a delay output terminal coupled to said integrator input terminal.

9. A method for generating a position control signal for a magnetic-disk reading head that reads servo signals and data from a magnetic storage medium, the method comprising:

receiving and amplifying an analog signal from said head;

low-pass and transversally filtering said signal;

converting said low-pass and transversally filtered analog signal into multiple digital signals by sampling said low-pass and transversally filtered analog signal fast enough to process said data;

processing each of said multiple digital signals with respective Viterbi detectors to generate multiple detected signals;

decoding said detected signals to generate a read signal that includes said data;

rectifying said digital signals to generate an intermediate digital signal; and asynchronously demodulating and integrating said intermediate digital signal to generate said control signal based on said servo signals, wherein integrating said intermediate digital signal includes computing an integral of the rectified digital signals.

10. The method of claim 9 wherein said integrating comprises:

delaying said control signal; and summing said delayed control signal with said intermediate signal to generate said control signal.

11. The method of claim 9 wherein said filtering comprises continuous-time filtering.

12. An apparatus for generating a control signal for a reading head that generates an analog signal while reading a magnetic media, the analog signal including both servo information and data, said apparatus comprising:

a transversal continuous-time analog filter operable to filter said analog signal;

multiple analog-to-digital converters each operable to convert a respective portion of said filtered analog signal into a respective digital signal, said analog-to-digital converters fast enough to process said data;

multiple Viterbi detectors each operable to convert a respective one of said digital signals into a respective detected signal;

a decoder structured to convert said detected signals into a data signal that includes said data;

a rectifier structured to generate an intermediate signal from said digital signals, said intermediate signal including said servo information; and a demodulator circuit having an integrator circuit operatively coupled to receive said intermediate signal and structured to asynchronously demodulate said intermediate signal, the integrator circuit structured to generate said control signal from said servo information that is included in said intermediate signal by computing an integral of said intermediate signal.

13. The apparatus of claim 12 wherein said integrator circuit, comprises:

a circuit structured to delay said control signal; and an adder structured to generate said control signal from the sum of said delayed control signal and said intermediate signal.

14. The apparatus of claim 12, further comprising a timing-control circuit coupled to receive the digital signals directly from said converters and is structured to generate timing signals for each of said converters in response to said digital signals.

* * * * *